No. 847,815. PATENTED MAR. 19, 1907.
W. A. PIGG.
TOBACCO KNIFE.
APPLICATION FILED NOV. 14, 1906.
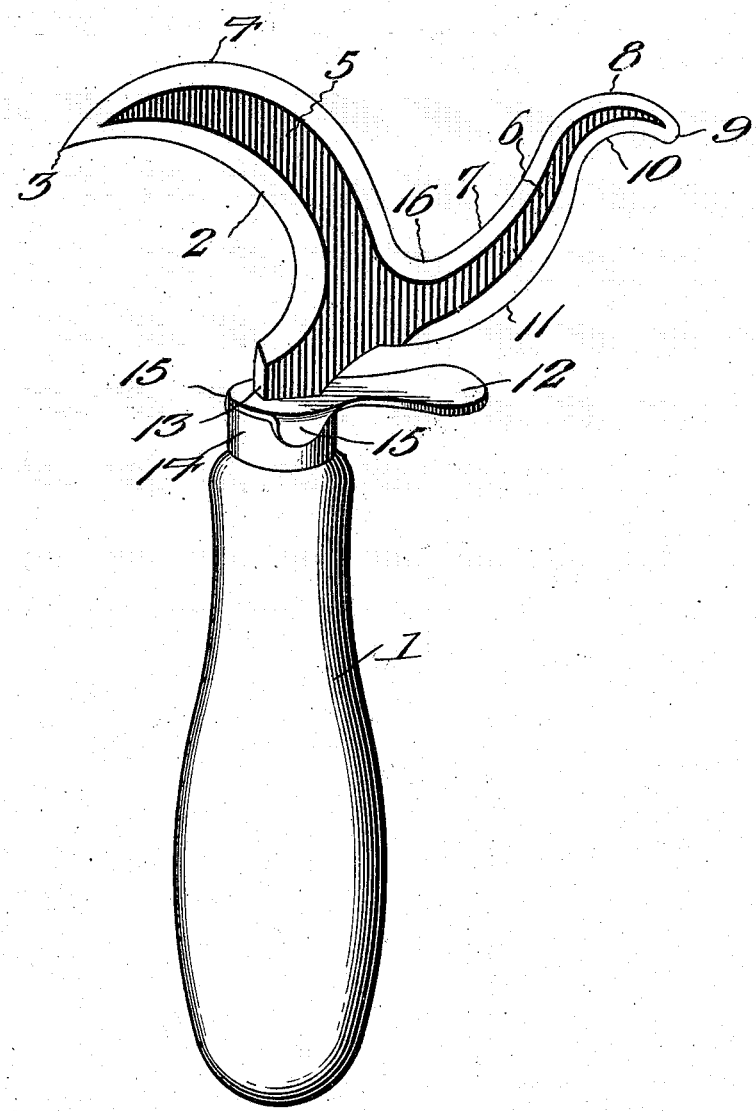

UNITED STATES PATENT OFFICE.

WILLIAM A. PIGG, OF FORT BARRANCAS, FLORIDA.

TOBACCO-KNIFE.

No. 847,815.　　　Specification of Letters Patent.　　Patented March 19, 1907.

Application filed November 14, 1906. Serial No. 343,432.

*To all whom it may concern:*

Be it known that I, WILLIAM A. PIGG, a citizen of the United States of America, residing at Fort Barrancas, in the county of Escambia and State of Florida, have invented new and useful Improvements in Tobacco-Knives, of which the following is a specification.

This invention relates to tobacco-knives designed more particularly for use in harvesting tobacco, but capable of other uses.

One of the principal objects of the invention is to provide a convenient tool for splitting tobacco stalks and for cutting the stalk after it has been split by a simple movement of the tool.

Another object of the invention is to provide a tobacco-harvester of simple construction which will quickly split the stalks without removing the leaves and which will be provided with a double cutting edge for splitting and cutting the stalks.

Still another object of the invention is to provide a tool of this character with a thumb-piece which will prevent the hand from slipping upon the handle and which will serve as an abutment in line with the splitting edges of the tool.

These and other objects may be attained, by means of the construction illustrated in the accompanying drawing, in which the figure is a perspective view of a tool made in accordance with my invention.

Referring to the drawing for a more particular description of my invention, the numeral 1 designates a handle which may be conveniently formed of wood, and inserted in one end of the handle is a cutter provided with a curved or sickle-like cutting edge 2, which extends from the shank of the blade on a curved line upwardly and outwardly and terminating in a point 3. The cutting edge continues from the point 3 to form a convex cutting edge 4, located upon the opposite edge of the shank 5 from the cutting edge 2. A shank 6 diverges from the shank 5 and is provided with a concave cutting edge 7, which terminates in a convex cutting portion 8, terminating in a rounded outer end 9, and the blade continuing under the shank 6 to form a concave cutting edge 10 and a convex edge 11. A thumb-brace 12 is disposed between a shoulder 13 on the cutter and the ferrule 14 of the handle, said thumb-brace having downwardly-turned lugs 15, which bear upon opposite sides of the ferrule 14 to hold the brace in alinement with the concave portion 16 of the splitting edge of the cutter.

The operation of my harvesting-knife may be briefly described as follows: By grasping the handle 1 and extending the thumb to bear upon the top of the thumb-brace 12 the diverging blades of the tool are presented at the top of the stalk and the tool is pushed downward to split the stalk, when the handle is pulled upward and turned to the right or left to sever the two split portions of the stalk on an angle or inclination at the lower end thereof.

From the foregoing it will be obvious that a tool made in accordance with my invention may be conveniently used for cutting broom-corn or as a kitchen implement for various purposes, as well as for an efficient harvesting-tool for tobacco.

Having thus described the invention, what I claim is—

1. A tobacco-harvesting knife comprising diverging shanks, a concave cutting edge on one side of one of said shanks, a convex cutting edge on the opposite side of said shank, a splitting-crotch, a concave and convex cutting-blade extending upon one side of said crotch, and a thumb-brace extending laterally from the handle in alinement with the splitting-crotch, substantially as described.

2. In a tool of the character described, a splitting-knife comprising diverging cutting edges, provided with intermediate splitting-crotch, and a thumb-brace provided with downturned lugs to embrace the end of the handle, and a thumb-bearing portion located in alinement with the splitting-crotch, substantially as described.

In testimony whereof I affix my signature in presence of two witnesses.

WILLIAM A. PIGG.

Witnesses:
GUSTAVE J. UNGER,
A. D. DUCK.